United States Patent
Ichikawa et al.

(10) Patent No.: US 10,586,529 B2
(45) Date of Patent: Mar. 10, 2020

(54) PROCESSING OF SPEECH SIGNAL

(71) Applicant: International Business Machines Corporation, Armonk, NY (US)

(72) Inventors: Osamu Ichikawa, Yokohama (JP);
Takashi Fukuda, Yokohama (JP);
Gakuto Kurata, Bunkyo-ku (JP);
Bhuvana Ramabhadran, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 15/704,426

(22) Filed: Sep. 14, 2017

(65) Prior Publication Data

US 2019/0080684 A1 Mar. 14, 2019

(51) Int. Cl.
| | | |
|---|---|---|
| G10L 15/06 | (2013.01) | |
| G10L 25/51 | (2013.01) | |
| G10L 15/04 | (2013.01) | |
| G10L 25/18 | (2013.01) | |
| G10L 15/22 | (2006.01) | |
| G10L 25/30 | (2013.01) | |

(52) U.S. Cl.
CPC ............ *G10L 15/063* (2013.01); *G10L 15/04* (2013.01); *G10L 15/22* (2013.01); *G10L 25/51* (2013.01); *G10L 25/18* (2013.01); *G10L 25/30* (2013.01)

(58) Field of Classification Search
CPC ........ G10L 15/063; G10L 25/18; G10L 25/51
USPC ........................................................ 704/243
See application file for complete search history.

(56) References Cited

U.S. PATENT DOCUMENTS

| | | | | |
|---|---|---|---|---|
| 5,617,508 A | * | 4/1997 | Reaves | .................. G10L 25/78 704/214 |
| 6,067,517 A | * | 5/2000 | Bahl | ...................... G10L 15/20 704/242 |
| 6,993,483 B1 | | 1/2006 | Milner | |

(Continued)

OTHER PUBLICATIONS

Davis, Alan, Sven Nordholm, and Roberto Togneri. "Statistical voice activity detection using low-variance spectrum estimation and an adaptive threshold." IEEE Transactions on Audio, Speech, and Language Processing 14.2 (2006): 412-424. (Year: 2006).*

(Continued)

*Primary Examiner* — Daniel C Washburn
*Assistant Examiner* — Oluwadamilola M Ogunbiyi
(74) *Attorney, Agent, or Firm* — Joseph P. Curcuru; Stephen R. Yoder (57) ABSTRACT

A computer-implemented method for processing a speech signal, includes: identifying speech segments in an input speech signal; calculating an upper variance and a lower variance, the upper variance being a variance of upper spectra larger than a criteria among speech spectra corresponding to frames in the speech segments, the lower variance being a variance of lower spectra smaller than a criteria among the speech spectra corresponding to the frames in the speech segments; determining whether the input speech signal is a special input speech signal using a difference between the upper variance and the lower variance; and performing speech recognition of the input speech signal which has been determined to be the special input speech signal, using a special acoustic model for the special input speech signal.

17 Claims, 6 Drawing Sheets

(56) References Cited

U.S. PATENT DOCUMENTS

| | | | |
|---|---|---|---|
| 7,386,443 B1* | 6/2008 | Parthasarathy | G10L 15/07 704/201 |
| 7,634,401 B2 | 12/2009 | Fukada | |
| 8,543,398 B1* | 9/2013 | Strope | G10L 15/063 704/235 |
| 8,751,229 B2 | 6/2014 | Ljolje et al. | |
| 9,123,331 B1 | 9/2015 | Strope et al. | |
| 2010/0324897 A1* | 12/2010 | Emori | G10L 15/04 704/243 |
| 2011/0151801 A1* | 6/2011 | Huang | H04B 17/345 455/67.13 |
| 2013/0216058 A1* | 8/2013 | Furuta | G10L 21/0232 381/71.1 |
| 2015/0206537 A1* | 7/2015 | Fusakawa | G10L 25/51 704/249 |
| 2016/0042734 A1* | 2/2016 | Cetinturk | G10L 15/02 704/236 |
| 2016/0155456 A1* | 6/2016 | Wang | G10L 25/81 704/208 |
| 2016/0260426 A1 | 9/2016 | Kim et al. | |
| 2016/0261743 A1* | 9/2016 | Grodek | G10L 25/51 |
| 2016/0267924 A1* | 9/2016 | Terao | G10L 25/84 |
| 2016/0275968 A1* | 9/2016 | Terao | G10L 25/84 |
| 2016/0379662 A1* | 12/2016 | Chen | G10L 21/0232 704/233 |
| 2017/0243602 A1* | 8/2017 | Yang | G10L 21/0264 |
| 2017/0270946 A1* | 9/2017 | Kaniewska | G10L 21/0232 |
| 2018/0005626 A1* | 1/2018 | Betley | G10L 15/063 |
| 2018/0158463 A1* | 6/2018 | Ge | G10L 17/04 |
| 2018/0247641 A1* | 8/2018 | Fukuda | G10L 15/16 |

OTHER PUBLICATIONS

Qiao et al, "A Study on Invariance of f-Divergence and Its Application to Speech Recognition," IEEE Transactions on Signal Processing, vol. 58 Issue 7, 2010, pp. 3884-3890. (Year: 2010).*

Nour-Eldin, et al., "Loss Recovery Through Spectral Interpolation for Robust Speech Recognition Over Packet Voice Communications", Signal Processing Conference, 2004 12th Edition, Sep. 6-10, 2004, Vienna Austria, pp. 1465-1468.

Zelinka et al., "Neural-Network-Based Spectrum Processing for Speech Recognition and Speaker Verification", Springer International Publishing Switzerland 2015, A.-H. Dediu et al. (Eds.): SLSP 2015, LNAI 9449, pp. 288-299, 2015. DOI: 10.1007/978-3-319-25789-1 27, 12 pages.

Zhang, Yan, "Speech Recognition Using Deep Learning Algorithms", Stanford University, <http://cs229.stanford.edu/proj2013/zhang_Speech%20Recognition%20Using%20Deep%20Learning%20Algorithms.pdf>, printed Jun. 8, 2017, 5 pages.

* cited by examiner

PROCESSING OF SPEECH SIGNAL

BACKGROUND

The present invention relates to processing of a speech signal. Recently, various techniques have been known regarding processing of a speech signal. Speech-To-Text (STT), automatic speech recognition service, is designed to accept human speech data spoken to a microphone or a telephone directly in real situations. However, automatic speech recognition service sometimes accepts unique speech data that appears to be pre-processed before sending to STT. The STT service fails to decode this type of data well. Generally speaking, automatic speech recognition can decode clean data very well, and struggle decoding noisy data.

SUMMARY

According to an embodiment of the present invention, a computer-implemented method for processing a speech signal is provided. The method includes identifying speech segments in an input speech signal. The method includes calculating an upper variance and a lower variance. The upper variance is a variance of upper spectra larger than a first criteria among speech spectra corresponding to frames in the speech segments. The lower variance is a variance of lower spectra smaller than a second criteria among the speech spectra corresponding to the frames in the speech segments. The method includes determining whether the input speech signal is a special input speech signal using a difference between the upper variance and the lower variance. The method includes performing speech recognition of the input speech signal which has been determined to be the special input speech signal, via a special acoustic model for the special input speech signal, and outputting a new speech signal by converting a speech signal in training data to log mel spectra each corresponding to one frame and performing a combination of two methods for the log mel spectra.

According to another embodiment of the present invention, there is an apparatus for processing a speech signal. The apparatus includes a processor and a memory coupled to the processor. The memory includes program instructions. The program instructions are executable by the processor to cause the processor to perform the aforementioned method.

According to yet another embodiment of the present invention, there is provided a computer program product for processing a speech signal. The computer program product includes a computer readable storage medium having program instructions embodied with the computer readable storage medium. The program instructions are executable by a computer to cause the computer to perform the aforementioned method.

DETAILED DESCRIPTION

Speech-To-Text (STT) Automatic speech recognition service possesses many limitations such as STT services failing to decode unique speech data and/or pre-processed voice and/or speech data. The conventional solutions for these limitations can include a user providing large amounts of audio data preferably with manually transcribed text then performing fine-tuning of the neural-network-based acoustic model using the acquired data, and/or a user providing a small amount of audio data with manually transcribed text and performing Feature-space Maximum Likelihood Linear Regression (fMLLR) or Maximum-Likelihood Linear Regression (MLLR) transformation for Gaussian Mixture Model(s) (GMM)-based acoustic model using the user data. However, it is difficult to obtain large amount of user audio data and GMM-based acoustic models are no longer used. Embodiments of the present invention, removes limitations of STT and improving the art by adapting general purpose acoustic models by fine-tuning generated data.

Hereinafter, exemplary embodiments of the present invention will be described in detail with reference to the attached drawings.

It is to be noted that the present invention is not limited to these exemplary embodiments to be given below and can be implemented with various modifications within the scope of the present invention. In addition, the drawings used herein are for purposes of illustration, and cannot show actual dimensions.

Some automatic speech recognition services sometimes accept special speech data and fail to decode such data well. The special speech data is defined as speech data which appears less noisy, but possesses a characteristic of having many time-frequency regions each with a very weak speech power (e.g., close to zero).

Figure 1:
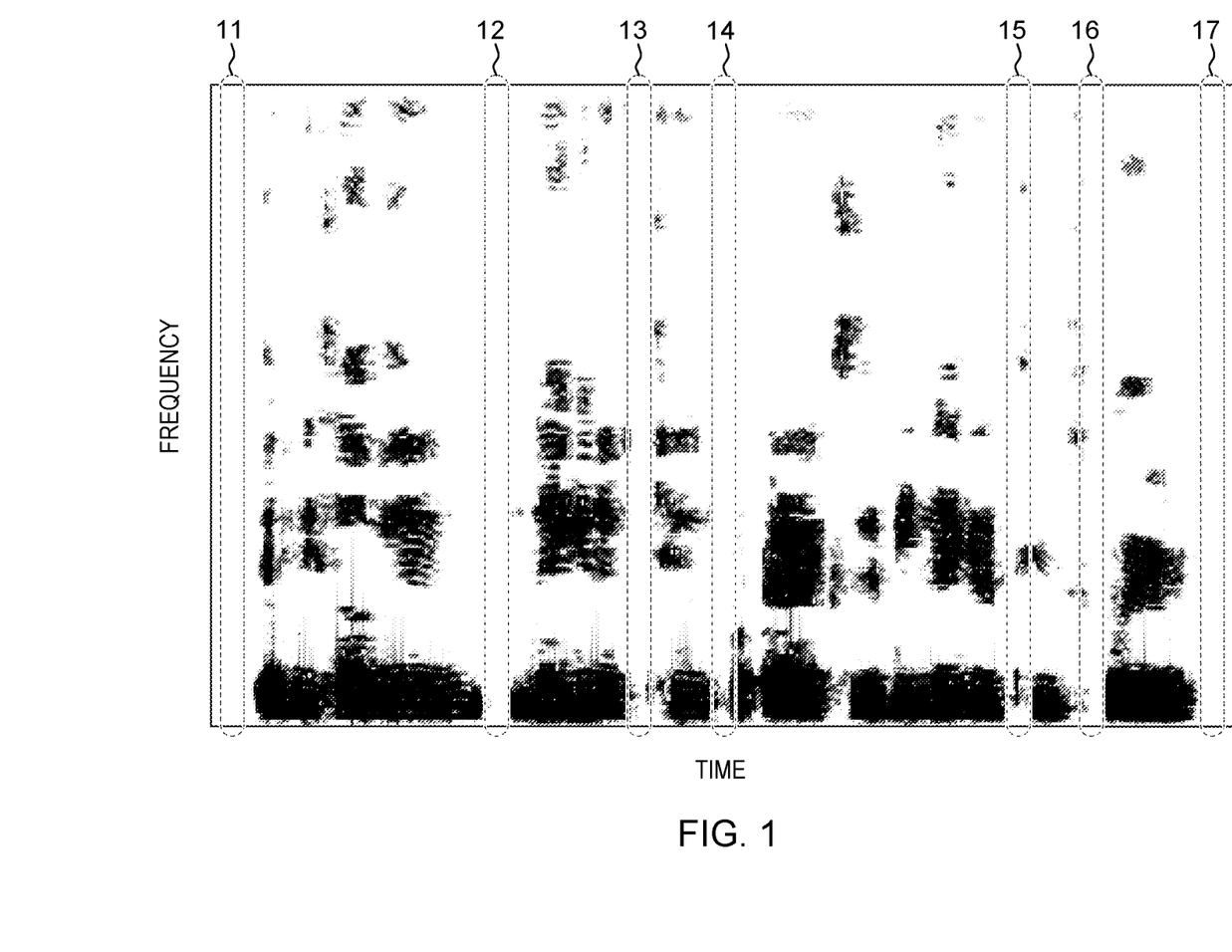
FIG. 1 depicts an example of special data according to exemplary embodiments of the present invention.

FIG. 1 shows an example of the special speech data. It is apparent also from FIG. 1 that the special speech data appears less noisy, but possesses a characteristic of having many time-frequency regions each with a very weak speech power (e.g., close to zero). For example, FIG. 1 shows the time-frequency regions 11 to 17. Thus, some automatic speech recognition services can perform very poorly.

In view of this, the exemplary embodiments can enable an automatic speech recognition service to improve the performance of automatic speech recognition of special speech data.

Figure 2:
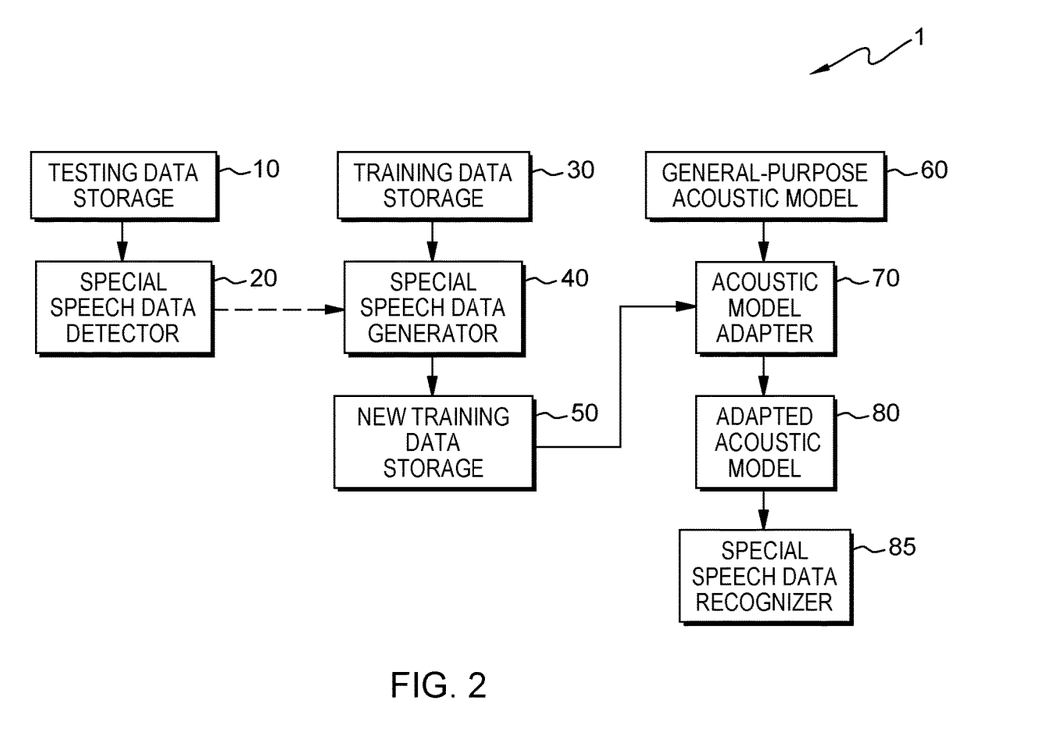
FIG. 2 depicts a block diagram of an acoustic model adaptation system according to a preferred exemplary embodiment of the present invention.

FIG. 2 shows a block diagram of acoustic model adaptation system 1 to which the preferred exemplary embodiment is applied. As shown in FIG. 2, acoustic model adaptation system 1 can include testing data storage 10 and special speech data detector 20. In various embodiments, adaption system 1 and/or all the subcomponents of adaption system 1 can be housed on a server computer. Additionally, in various embodiments, acoustic model adaptation system 1 can include training data storage 30, special speech data generator 40, and/or new training data storage 50. Furthermore, acoustic model adaptation system 1 can include general-purpose acoustic model 60, acoustic model adapter 70, adapted acoustic model 80, and/or special speech data recognizer 85. Note that an arrow from special speech data detector 20 to special speech data generator 40 is can be made as a dashed arrow, because special speech data detector 20 does not always transmit information about the special speech data (e.g., M*(d), V*$_U$(d), V*$_L$(d) described later) to special speech data generator 40.

Testing data storage 10 can store the testing data for testing/determining whether speech data input from speakers is special speech data. The testing data is assumed to include plural speech signals, each of which corresponds to one utterance. The testing data can be in the form of wave data. Note that a speech signal in the testing data serves as one example of the claimed input speech signal.

Special speech data detector 20 can detect the special speech data from the testing data stored in testing data storage 10. In various embodiments, special speech data detector 20 can determine that the testing data stored in testing data storage 10 is the special speech data. Special speech data detector 20 can detect a special speech signal (e.g., a speech signal having a characteristic of the special speech data) by converting a speech signal in the testing data to log mel spectra, wherein each speech signal corresponds to one frame, calculating lower and upper variances over frames of the log mel spectra, and performing classification between the special speech signal and other speech signals based on the lower and upper variances. The detection method of the special speech data is described later in FIG. 3. In various embodiments, special speech data detector 20 can report to the automatic speech recognition service whether the testing data is identified as special speech data. Note that the special speech signal serves as one example of the claimed special input speech signal.

Training data storage 30 can store training data for training general-purpose acoustic model 60. The training data is assumed to include plural speech signals, each of which corresponds to one utterance. The training data can be in the form of wave data. Note that a speech signal in the training data serves as one example of the claimed training speech signal.

Special speech data generator 40 can generate and/or output new training data from the training data stored in training data storage 30 when the automatic speech recognition service has received a report and/or notification from special speech data detector 20 that the testing data is the special speech data. Special speech data generator 40 can generate and/or output a new speech signal by converting a speech signal in the training data to log mel spectra each corresponding to one frame and performing either or a combination of two methods for the log mel spectra. In various embodiments, one of the two methods can be either noise addition and over-subtraction, or a lower and upper variance normalization to simulate the lower and upper variances of the detected special speech data. The generation method of the new training data is described further in FIG. 4. Note that the new speech signal serves as one example of the claimed special training speech signal.

New training data storage 50 can store the new training data generated by special speech data generator 40.

General-purpose acoustic model 60 can be an acoustic model used for general purposes. In the preferred exemplary embodiment, general-purpose acoustic model 60 is a neural network-based.

Acoustic model adapter 70 can adapt general-purpose acoustic model 60 by fine-tuning it using the new training data stored in new training data storage 50. Assuming that general-purpose acoustic model 60 is neural network-based, acoustic model adapter 70 can fine-tune general-purpose acoustic model 60 by performing forward and backward propagation using the new training data stored in new training data storage 50.

Adapted acoustic model 80 can be an acoustic model generated by adapting general-purpose acoustic model 60. Adapted acoustic model 80 can be used to perform automatic speech recognition of the special speech data and output speech recognition results and/or data. Note that adapted acoustic model 80 serves as one example of the claimed special acoustic model.

Special speech data recognizer 85 can perform speech recognition of the speech data which has been determined to be the special speech data by special speech data detector 20, using adapted acoustic model 80.

Figure 3:
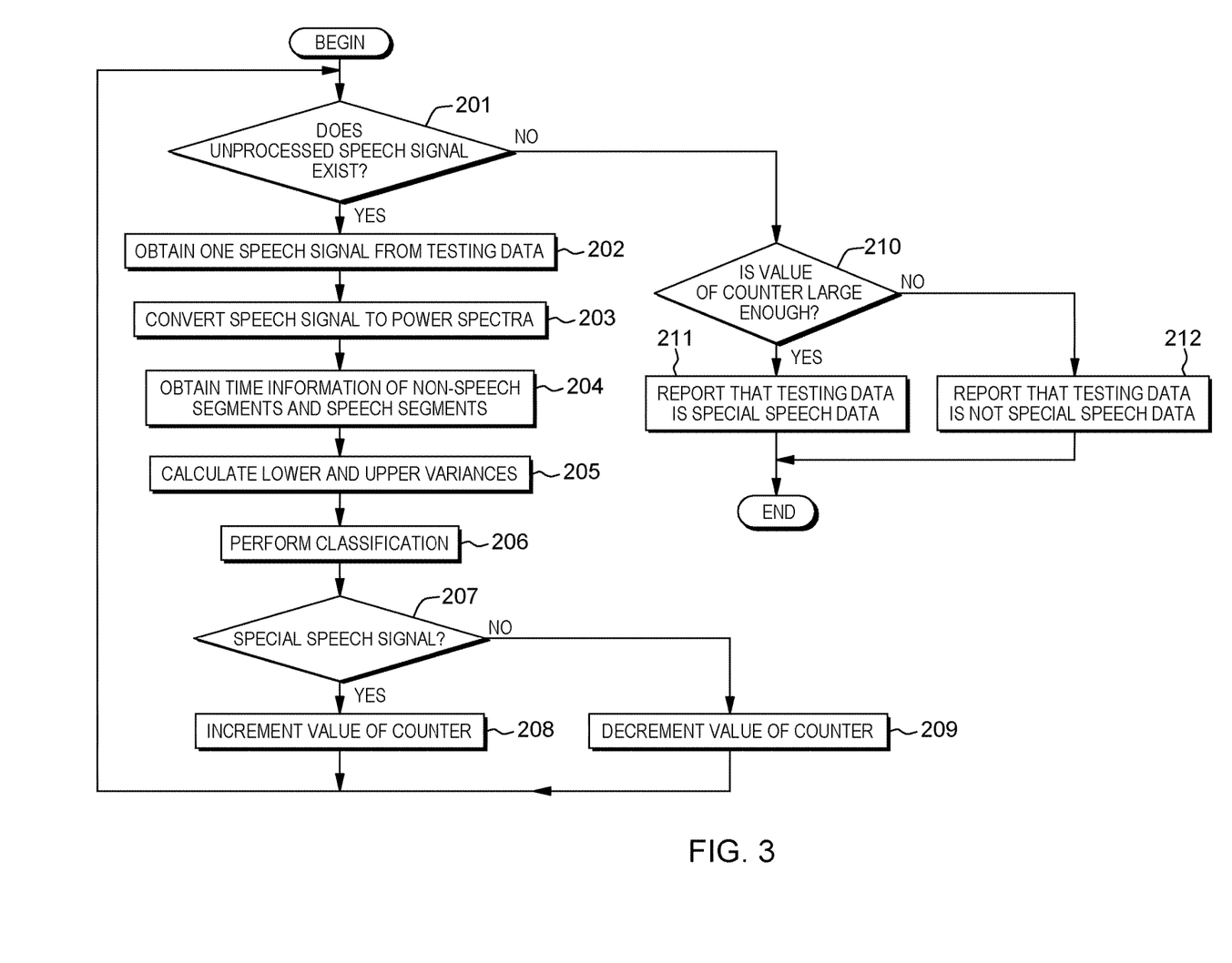
FIG. 3 depicts a flowchart representing an example of an operation of a special speech data detector included in the acoustic model adaptation system.

FIG. 3, is a flowchart depicting operational steps describing a method for testing special speech data. Additionally FIG. 3, is an embodiment of an operation of special speech data detector 20.

As shown in FIG. 3, special speech data detector 20 can first determine whether an unprocessed speech signal exists in the testing data stored in testing data storage 10 (step 201).

If one or more unprocessed speech signals exist in the testing data stored in testing data storage 10, special speech data detector 20 can obtain one speech signal from the testing data (step 202).

Then, special speech data detector 20 can convert the speech signal to power spectra of the speech signal (step 203). Specifically, special speech data detector 20 can divide the speech signal into frames using a window function, and can obtain, for each frame, a power spectrum by performing a discrete Fourier transform (DFT) of the speech signal.

Next, special speech data detector 20 can obtain time information of non-speech segments and speech segments in the speech signal (step 204). Specifically, special speech data detector 20 can perform voice activity detection (VAD) by referring to the power spectra, and can obtain the time information indicating timings at which the non-speech segments and the speech segments are observed.

Subsequently, in various embodiments, special speech data detector 20 can calculate lower and upper variances over frames of log mel spectra (step 205).

At this step, first, special speech data detector 20 can convert, for each frame, the power spectrum to a log mel spectrum S(t, d) using a mel filter bank. The variable t denotes a frame, and the variable d denotes a mel filter bank index (e.g., a dimension).

Secondly, special speech data detector 20 can get an average over frames t of the log mel spectra S(t, d). The average is referred to as a mean spectrum M*(d). The mean spectrum M*(d) can be calculated using Equation 1.

$$M^*(d) = \sum_t S(t, d) / \sum_t 1 \qquad \text{Equation 1}$$

Thirdly, special speech data detector 20 can calculate a lower variance V*$_L$(d) and an upper variance V*$_U$(d). Specifically, special speech data detector 20 can compare, for each frame t in the speech segments and for each mel filter bank index d, the log mel spectrum S(t, d) with the mean spectrum M*(d). If the log mel spectrum S(t, d) for a frame t is larger than the mean spectrum M*(d), special speech data detector 20 can use the log mel spectrum S(t, d) for the frame t (the upper spectrum) to calculate the upper variance $V^*_U(d)$. If the log mel spectrum S(t, d) for a frame t is smaller than mean spectrum M*(d), special speech data detector 20 can use the log mel spectrum S(t, d) for the frame t (the lower spectrum) to calculate the lower variance $V^*_L(d)$. That is, the upper variance $V^*_U(d)$ and the lower variance $V^*_L(d)$ can be calculated using Equation 2. Note that other criteria can be used instead of the mean spectrum M*(d), and the first criteria and the second criteria can be used to calculate the upper variance $V^*_U(d)$ and the lower variance $V^*_L(d)$, respectively. It should be noted that the first and second criteria can be predetermined criteria.

$$V^*_U(d) = \sum_t \text{flag}(t, d)(S(t, d) - M^*(d))^2 / \sum_t \text{flag}(t, d) \quad \text{Equation 2}$$

$$V^*_L(d) = \sum_t (1 - \text{flag}(t, d))(S(t, d) - M^*(d))^2 / \sum_t (1 - \text{flag}(t, d))$$

flag(t, d) = 1 if S(t, d) > M*(d)

flag(t, d) = 0 otherwise

Provides an example on how to calculate the upper variance $V^*_U(d)$ and the lower variance $V^*_L(d)$.

Then, special speech data detector 20 can perform classification between the special speech signal and other speech signals (step 206). In the special speech data, the lower variance $V^*_L(d)$ and the upper variance $V^*_U(d)$ have been found to be imbalanced. Thus, the classification can be performed depending on how much the lower variance $V^*_L(d)$ and the upper variance $V^*_U(d)$ differ.

In the preferred exemplary embodiment, at this step, first, special speech data detector 20 can calculate a square distance W(d) between the square root of the lower variance $V^*_L(d)$ and the square root of the upper variance $V^*_U(d)$. That is, the square distance W(d) can be calculated using the Equation 3.

$$W(d) = (\sqrt{V^*_L(d)} - \sqrt{V^*_U(d)})^2 \quad \text{Equation 3}$$

Secondly, special speech data detector 20 can get an average over mel filter bank indexes d of the square distances W(d). The average is referred to as a metric R. The metric R can be calculated using the Equation 4.

$$R = \sum_d W(d) / \sum_d 1 \quad \text{Equation 4}$$

Next, special speech data detector 20 can determine whether the obtained speech signal is the special speech signal (step 207). Specifically, special speech data detector 20 can determine whether the metric R is larger than a predetermined threshold. The predetermined threshold can be an F-measure value which balances between precision and recall of the classification.

In various embodiments, if the obtained speech signal is the special speech signal, special speech data detector 20 can increment the value of a counter (step 208). In other embodiments, if at step 207, the obtained speech signal is not the special speech signal, special speech data detector 20 can decrement the value of the counter (step 209). Then, special speech data detector 20 can advance the processing to step 201.

If, at step 201, no unprocessed speech signal exists in the testing data stored in testing data storage 10, special speech data detector 20 can determine whether the value of the counter is large enough (step 210). Specifically, special speech data detector 20 can determine whether a ratio of the value of the counter to the number of the speech signals in the testing data is larger than a predetermined ratio.

In various embodiments, if the value of the counter is large enough, special speech data detector 20 can report to the automatic speech recognition service that the testing data is special speech data to (step 211).

In various embodiments, in response to this report, the automatic speech recognition service can determine whether an acoustic model matching the detected special speech data exists among plural acoustic models prepared in advance for plural types of special speech data. In various embodiments, if the acoustic model matching the detected special speech data exists, the automatic speech recognition service can perform automatic speech recognition using this existing acoustic model. However, in various embodiments, if the acoustic model matching the detected special speech data does not exist, the automatic speech recognition service can instruct special speech data generator 40 and acoustic model adapter 70 to generate an acoustic model for the detected special speech data. Note that the automatic speech recognition service can determine whether an acoustic model matches the detected special speech data using a difference between a vector W(d) obtained from the detected special speech data and a vector W(d) obtained from special speech data used to generate the acoustic model.

In various embodiments, if at step 210, the value of the counter is not large enough, special speech data detector 20 can report that the testing data is not the special speech data (step 212).

Figure 4:
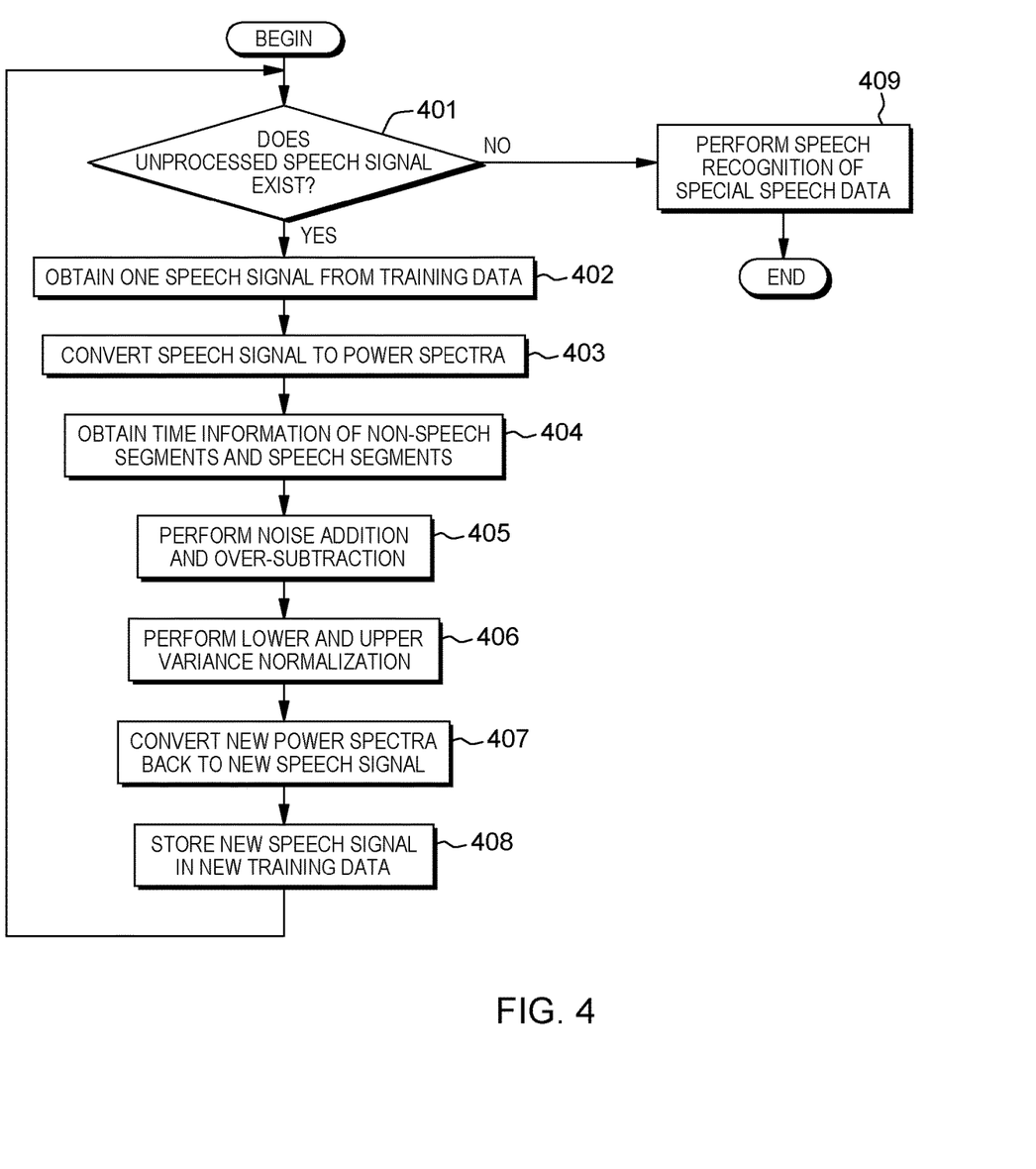
FIG. 4 depicts a flowchart representing an example of an operation of a special speech data generator included in the acoustic model adaptation system.

FIG. 4 depicts a flowchart representing an example of an operation of special speech data generator 40 and special speech data recognizer 85 according to the preferred exemplary embodiment.

As shown in the figure, special speech data generator 40 can first determine whether an unprocessed speech signal exists in the training data stored in training data storage 30 (step 401).

If one or more unprocessed speech signals exist in the training data stored in training data storage 30, special speech data generator 40 can obtain one speech signal from the training data (step 402).

Then, special speech data generator 40 can convert the speech signal to power spectra of the speech signal (step 403). Specifically, special speech data generator 40 can divide the speech signal into frames using a window function, and can obtain, for each frame, a power spectrum by performing a discrete Fourier transform (DFT) of the speech signal.

Next, in various embodiments, special speech data generator 40 can obtain time information of non-speech segments and speech segments in the speech signal (step 404). Specifically, special speech data generator 40 can perform voice activity detection (VAD) by referring to the power spectra, and can obtain the time information indicating timings at which the non-speech segments and the speech segments are observed.

Subsequently, special speech data generator 40 can perform noise addition and over-subtraction (step 405).

At this step, first, special speech data generator 40 can perform, for each frame, noise addition over the power spectrum of the speech segments. Note that, in this noise addition, some general noise data obtained in an external environment can be added.

Secondly, in various embodiments, special speech data generator 40 can calculate, for each frame, an over-subtracted power spectrum $\hat{S}(t, i)$ by performing over-subtraction of the power spectrum, via Equation 5. The variable t denotes a frame, and the variable i denotes a frequency bin index. Further, the parameter α denotes a subtraction factor, and the parameter β denotes a flooring coefficient. Furthermore, the function MAX(x, y) indicates the maximum of x and y, and the function N(i) indicates noise of a power spectrum of the frequency bin index i.

$$\hat{S}(t,i) = \text{MAX}(S(t,i) - \alpha \cdot N(i), \beta \cdot N(i)) \quad \text{Equation 5}$$

In this Equation 5, special speech data generator 40 can use an unusually larger value (e.g., 5.0) as a value of the parameter α, and a small value (e.g., 0.0) as a value of the parameter β. By such over-subtraction, missing parts of the speech signal can be made.

Meanwhile, special speech data generator 40 can perform a lower and upper variance normalization so as to simulate the lower and upper variances of the special speech data detected in the flowchart of FIG. 3 (step 406).

At this step, first, special speech data generator 40 can convert, for each frame, the power spectrum to a log mel spectrum S(t, d) using a mel filter bank. The variable t denotes a frame, and the variable d denotes a mel filter bank index (a dimension).

Secondly, special speech data generator 40 can receive, from the automatic speech recognition service, the mean spectrum M*(d), the lower variance V*$_L$(d) and the upper variance V*$_U$(d) calculated at step 205 of FIG. 3. If plural special speech signals have been detected by special speech data detector 20, special speech data generator 40 can receive averages of mean spectra, lower variances and upper variances obtained from the plural special speech signals, as the mean spectrum M*(d), the lower variance V*$_L$(d) and the upper variance V*$_U$(d). Note that, although special speech data generator 40 is assumed to receive the mean spectrum M*(d), the lower variance V*$_L$(d) and the upper variance V*$_U$(d) at this timing, the timing of receiving them is not limited to this. Special speech data generator 40 can receive them at any time before calculation described below using them.

Thirdly, special speech data generator 40 can obtain, from the training data stored in training data storage 30, a mean spectrum M(d), a lower variance V$_L$(d) and an upper variance V$_U$(d). Note that, although special speech data generator 40 is assumed to obtain the mean spectrum M(d), the lower variance V$_L$(d) and the upper variance V$_U$(d) at this timing, the timing of obtaining them is not limited to this. Special speech data generator 40 can obtain them at any time before calculation described below using them.

Fourth, special speech data generator 40 can calculate, for each frame t and for each mel filter bank index d, a new log mel spectrum $\hat{S}(t, d)$ by performing the lower and upper variance normalization of the power spectrum by either one of the Equation 6 in the first and second rows.

$$\hat{S}(t, d) = (S(t, d) - M(d)) \quad \text{Equation 6}$$

$$\left\{ \text{flag}(t, d) \frac{\sqrt{V_U^*(d)}}{\sqrt{V_U(d)}} + (1 - \text{flag}(t, d)) \frac{\sqrt{V_L^*(d)}}{\sqrt{V_L(d)}} \right\} +$$

-continued $$\hat{S}(t, d) = (S(t, d) - M(d)) \left\{ \text{flag}(t, d) \frac{\sqrt{V_U^*(d)}}{\sqrt{V_U(d)}} + (1 - \text{flag}(t, d)) \frac{\sqrt{V_L^*(d)}}{\sqrt{V_L(d)}} \right\} + M(d)$$

flag(t, d) = 1 if S(t, d) > M(d)

flag(t, d) = 0 otherwise

Fifth, special speech data generator 40 can convert, for each frame, the new log mel spectrum $\hat{S}(t, d)$ to a new power spectrum.

After that, special speech data generator 40 can convert new power spectra back to a new speech signal (step 407).

Then, special speech data generator 40 can store the new speech signal in the new training data stored in new training data storage 50 (step 408).

If, at step 401, no unprocessed speech signal exists in the training data stored in training data storage 30, special speech data recognizer 85 can perform speech recognition of the speech data which has been determined to be the special speech data by special speech data detector 20, using adapted acoustic model 80 (step 409). Then, special speech data recognizer 85 can end the processing.

Note that, although special speech data generator 40 is assumed to operate so as to perform both of steps 405 and 406 in the flowchart of FIG. 4, the operation is not limited to this. For example, special speech data generator 40 can operate so as to perform only step 405. That is, special speech data generator 40 can perform the noise addition and the over-subtraction, and can not perform the lower and upper variance normalization. Further, special speech data generator 40 can operate so as to perform only step 406. That is, special speech data generator 40 can not perform the noise addition and the over-subtraction, and can perform the lower and upper variance normalization.

Subsequently, acoustic model adapter 70 can adapt general-purpose acoustic model 60 to generate adapted acoustic model 80, using the new training data stored in new training data storage 50. Specifically, acoustic model adapter 70 can fine-tune general-purpose acoustic model 60 using the new training data in which the new speech signal has been included at step 408 of FIG. 4. Adapted acoustic model 80 thus generated can be used to perform automatic speech recognition of the special speech data.

Note that, although the acoustic model adaptation system 1 is assumed to be configured so that special speech data detector 20 tests plural speech signals each corresponding to one utterance stored in testing data storage 10 in the preferred exemplary embodiment, the configuration is not limited to this. For example, the acoustic model adaptation system 1 can be configured so that special speech data detector 20 tests one speech signal corresponding to one utterance when it is input. In this case, FIG. 2 can be changed so that a receiver is provided instead of testing data storage 10. Further, FIG. 3 can be changed so that steps 201 and 210 to 212 are deleted, a step "Obtain One Speech Signal Which Has Been Input" is performed instead of step 202, a step "Report That Speech Signal Is Special Speech Signal" is performed instead of step 208, a step "Report That Speech Signal Is Not Special Speech Signal" is performed instead of 209, and an arrow from step 208 or 209 to "End" is arranged instead of an arrow from step 208 or 209 to step 201.

Next, an alternative exemplary embodiment will be described. The alternative exemplary embodiment is the same as the preferred exemplary embodiment except for the processing at step 206 of FIG. 3. That is, in the preferred exemplary embodiment, special speech data detector 20 is assumed to calculate the metric R, which is a scalar, from the square distance W(d), which is a vector, and is assumed to determine whether the speech signal is the special speech signal using the scalar. Whereas, in the alternative exemplary embodiment, special speech data detector 20 can determine statistically whether the speech signal is the special speech signal using the square distance W(d), which is a vector, as it is.

Specifically, first, special speech data detector 20 can calculate, for each mel filter bank index, feature vectors from special speech signals, and feature vectors from general speech signals other than the special speech signals. The former feature vectors are referred to as positive examples, and the latter feature vectors are referred to as negative examples.

Secondly, special speech data detector 20 can train a classifier classifying the special speech signals and other speech signals by setting the positive examples and the negative examples to input of the classifier.

Thirdly, when performing classification, special speech data detector 20 can obtain classification result by entering the square distance W(d) into the classifier.

The classifier can be implemented using various techniques such as a Gaussian Mixture Model (GMM), a neural network, a Support Vector Machine (SVM), and the like.

In the case where the classifier is implemented using the GMM, special speech data detector 20 can create a positive GMM learned from only the positive examples and a negative GMM learned from only the negative examples. When performing classification, special speech data detector 20 can calculate, for the square distance W(d), a likelihood of the positive GMM and a likelihood of the negative GMM. Then, special speech data detector 20 can determine that the speech signal is the special speech signal, if a difference between the likelihood of the positive GMM and the likelihood of the negative GMM is larger than a predetermined threshold.

Further, in the case where the classifier is implemented using the neural network, special speech data detector 20 can configure the neural network so that it is multilayered, and it has inputs the number of which is the same as the number of dimensions of the square distance W(d) and has one output. Then, special speech data detector 20 can train the classifier so that it outputs "1" in response to input of the positive examples and outputs "0" in response to input of the negative examples. When performing classification, special speech data detector 20 can determine that the speech signal is the special speech signal, if an output from the neural network in response to input of the square distance W(d) is larger than a predetermined threshold.

Furthermore, in the case where the classifier is implemented using the SVM, special speech data detector 20 can train the SVM for two classes, namely the positive examples and the negative examples. When performing classification, special speech data detector 20 can obtain an output of the SVM in response to input of the square distance W(d).

Next, hardware configurations of special speech data detector 20, special speech data generator 40, and acoustic model adapter 70 are described. Note that special speech data detector 20, special speech data generator 40, and acoustic model adapter 70 have the same hardware configuration, so the description will be for the hardware configuration of computer 90.

Figure 5:
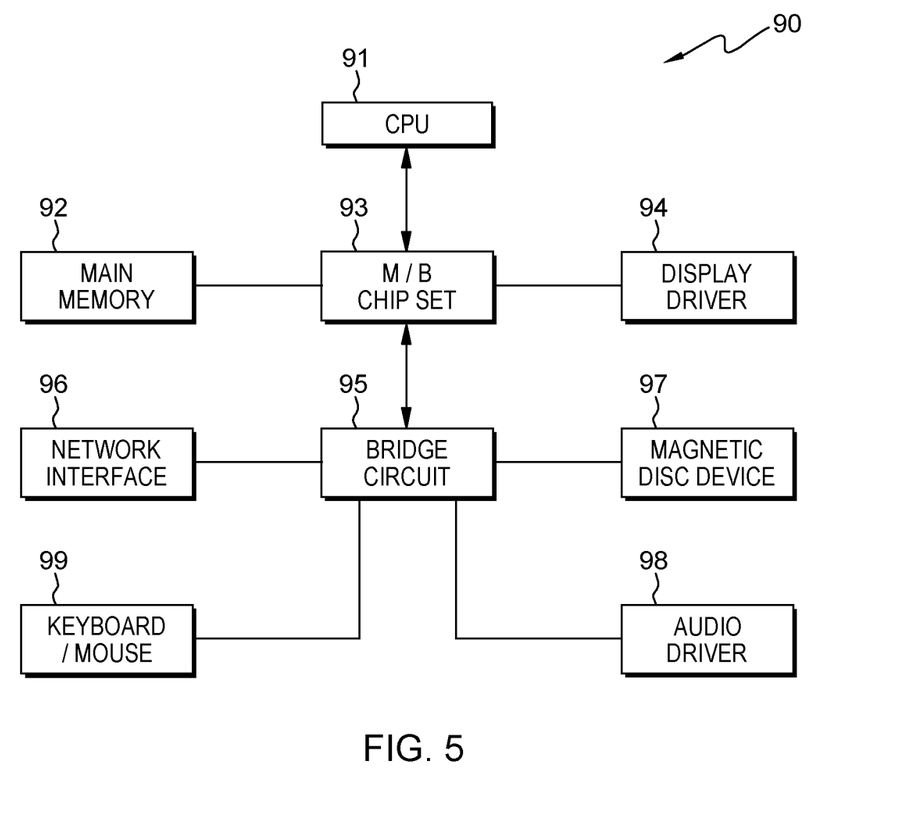
FIG. 5 depicts an example of a hardware configuration of a computer applicable to the acoustic model adaptation system according to exemplary embodiments of the present invention.

FIG. 5 depicts an example of a hardware configuration of the computer 90. As shown in the figure, the computer 90 can include central processing unit (CPU) 91 serving as one example of a processor, main memory 92 connected to the CPU 91 via motherboard (M/B) chip set 93 and serving as one example of a memory, and display driver 94 connected to the CPU 91 via the same M/B chip set 93, network interface 96, magnetic disk device 97, audio driver 98, and keyboard/mouse 99 are also connected to the M/B chip set 93 via bridge circuit 95.

In FIG. 5, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 can be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express can be used for the connection, for example. For connecting the magnetic disk device 97 to the bridge circuit 95, a serial AT attachment (ATA), a parallel-transmission ATA, or peripheral components interconnect (PCI) can be used. For connecting the keyboard/mouse 99 to the bridge circuit 95, a universal serial bus (USB) can be used. In various embodiments, computer 90 can a server computer.

Figure 6:
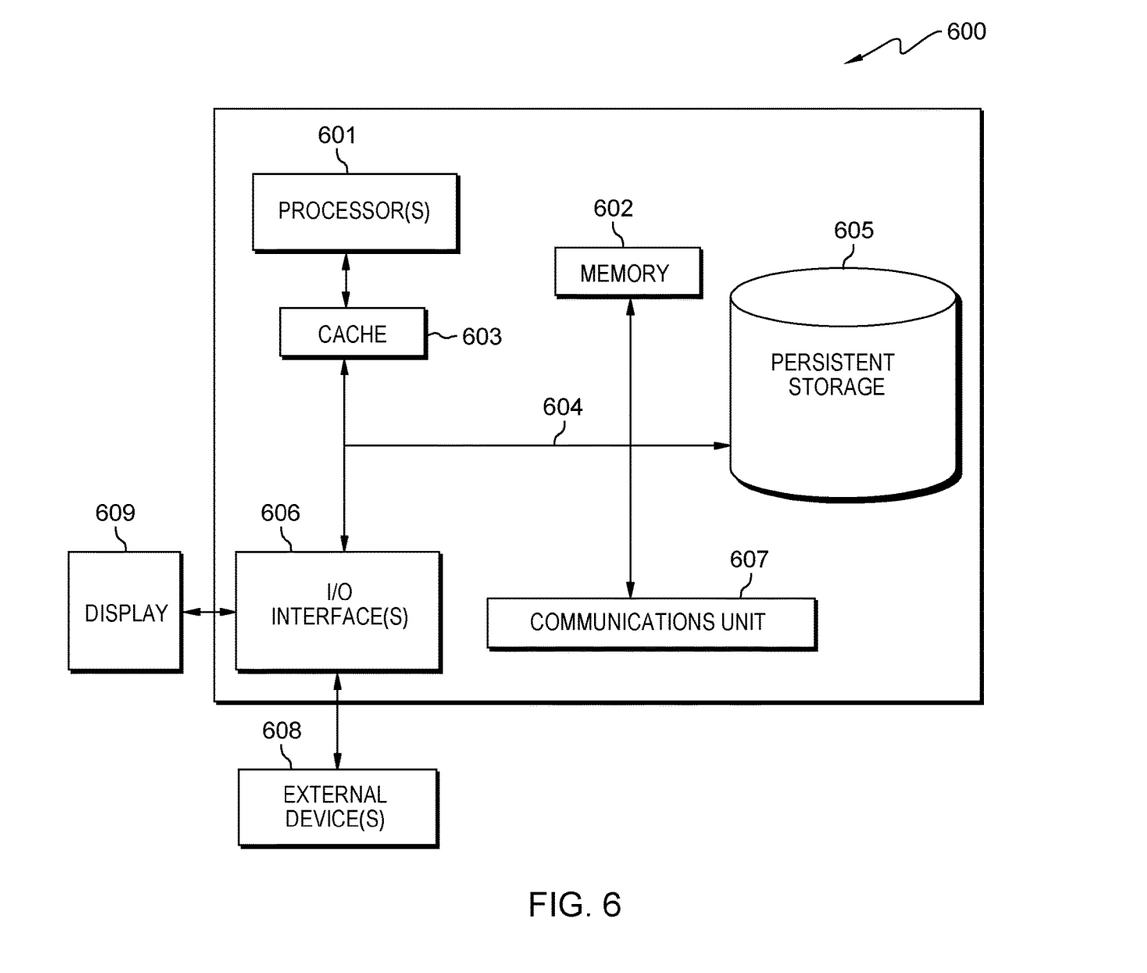
FIG. 6 depicts a block diagram of components of the server computer executing the calibration component within the distributed data processing environment of FIG. 1, in accordance with an embodiment of the present invention.

FIG. 6 depicts a block diagram of components a server computer within a distributed data processing environment, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

FIG. 6 depicts a block diagram of components of a server computer within adaption system 1 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

FIG. 6 depicts computer system 600, where a server computer represents an example of computer system 600 that includes adaptive illumination component 112. The computer system includes processors 601, cache 603, memory 602, persistent storage 605, communications unit 607, input/output (I/O) interface(s) 606 and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processors 601 by holding recently accessed data, and data near recently accessed data, from memory 602.

Program instructions and data used to practice embodiments of the present invention may be stored in persistent storage 605 and in memory 602 for execution by one or more of the respective processors 601 via cache 603. In an embodiment, persistent storage 605 includes a magnetic hard disk drive. Alternatively, or in addition to a magnetic hard disk drive, persistent storage 605 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605.

Communications unit 607, in these examples, provides for communications with other data processing systems or devices. In these examples, communications unit 607 includes one or more network interface cards. Communications unit 607 may provide communications through the use of either or both physical and wireless communications links. Program instructions and data used to practice embodiments of the present invention may be downloaded to persistent storage 605 through communications unit 607.

I/O interface(s) 606 enables for input and output of data with other devices that may be connected to each computer system. For example, I/O interface 606 may provide a connection to external devices 608 such as a keyboard, keypad, a touch screen, and/or some other suitable input device. External devices 608 can also include portable computer readable storage media such as, for example, thumb drives, portable optical or magnetic disks, and memory cards. Software and data used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving processing a speech signal, the method comprising:
    identifying, by one or more processors, speech segments in an input speech signal, wherein the input speech signal is a speech signal in training data;
    calculating, by the one or more processors, an upper variance and a lower variance, wherein the upper variance is a variance of an upper spectra larger than a first criterion among speech spectra corresponding to frames in the speech segments, and wherein the lower variance is a variance of a lower spectra smaller than a second criterion among the speech spectra corresponding to the frames in the speech segments, wherein the calculating further comprises:
        calculating, by the one or more processors, for a plurality of dimensions of the speech spectra, a plurality of upper variances and a plurality of lower variances;
    generating, by the one or more processors, an acoustic model for detecting special speech data;
    determining, by the one or more processors, whether the input speech signal is a special speech signal based on the acoustic model to determine the difference between the upper variance and the lower variance, wherein the determining further comprises:
        determining, by the one or more processors, whether the input speech signal is the special input speech signal based on comparison results between an average of a plurality of differences and a predetermined threshold, each of the plurality of differences being a difference between one of the plurality of upper variances and corresponding one of the plurality of lower variances;
    responsive to determining the input speech signal is special, performing, by the one or more processors, a speech recognition of the special speech signal which has been determined to be special based on the generated acoustic model; and
    outputting, by the one or more processors, a new speech signal by converting the input speech signal to log mel spectra, wherein the input speech signal corresponds to one frame.

2. The method of claim 1, wherein the calculating further comprises calculating, for a plurality of dimensions of the speech spectra, a plurality of upper variances and a plurality of lower variances, and the determining comprises determining whether the input speech signal is the special input speech signal based on output results of a classifier in response to input of a plurality of differences, each of the plurality of differences being a difference between one of the plurality of upper variances and corresponding one of the plurality of lower variances.

3. The method of claim 1, wherein generating further comprises generating at least one of a special training speech signal imitating the special input speech signal, or the special acoustic model and wherein the special speech data appears less noisy than other speech data, but possesses a characteristic of having many time-frequency regions each with a very weak speech power and the special speech signal has the characteristics of the special speech data.

4. The method of claim 3, wherein the generating further comprises generating the special training speech signal by performing noise addition and over-subtraction for a training speech signal.

5. The method of claim 3, wherein the generating further comprises generating the special training speech signal by performing a processing to set the upper variance and the lower variance for a training speech signal.

6. The method of claim 1, further comprising determining, by the one or more processors, if the acoustic model matches detected speech data.

7. The method of claim 6, wherein determining if the acoustic model matches the detected speech data comprises determining a difference between a first vector obtained from the detected speech data and a second vector obtained from model speech data used to generate the acoustic model.

8. An apparatus for improving processing a speech signal, the apparatus comprising:
    a processor; and a memory coupled to the processor, wherein the memory comprises program instructions executable by the processor to cause the processor to perform a method comprising:

identifying speech segments in an input speech signal, wherein the input speech signal is a speech signal in training data;

calculating an upper variance and a lower variance, the upper variance being a variance of upper spectra larger than a criterion among speech spectra corresponding to frames in the speech segments, the lower variance being a variance of lower spectra smaller than a criterion among the speech spectra corresponding to the frames in the speech segments, wherein the calculating further comprises:

calculating for a plurality of dimensions of the speech spectra, a plurality of upper variances and a plurality of lower variances;

generating, by the one or more processors, an acoustic model for detecting special speech data;

determining whether the input speech signal is a special input speech signal using a difference between the upper variance and the lower variance, wherein the determining further comprises:

determining whether the input speech signal is the special input speech signal based on comparison results between an average of a plurality of differences and a predetermined threshold, each of the plurality of differences being a difference between one of the plurality of upper variances and corresponding one of the plurality of lower variances; and responsive to determining the input speech signal is special, program instructions to perform speech recognition of the special speech signal which has been determined to be special based on the generated acoustic model.

9. The apparatus of claim 8, wherein the calculating comprises calculating, for a plurality of dimensions of the speech spectra, a plurality of upper variances and a plurality of lower variances, and the determining comprises determining whether the input speech signal is the special input speech signal based on output results of a classifier in response to input of a plurality of differences, each of the plurality of differences being a difference between one of the plurality of upper variances and corresponding on of the plurality of lower variances.

10. The apparatus of claim 8, wherein the method further comprises:

generating a special training speech signal imitating the special input speech signal; and preparing the special acoustic model; and wherein the special speech data appears less noisy than other speech data but possesses a characteristic of having many time-frequency regions each with a very weak speech power and the special speech signal has the characteristics of the special speech data.

11. The apparatus of claim 10, wherein the generating comprises generating the special training speech signal by performing noise addition and over-subtraction for a training speech signal.

12. The apparatus of claim 10, wherein the generating comprises generating the special training speech signal by performing a processing to set the upper variance and the lower variance for a training speech signal.

13. A computer program product for improving processing a speech signal, the computer program product comprising a computer readable storage medium having program instructions embodied therewith, the program instructions executable by a computer to cause the computer to perform a method comprising:

program instructions to identify speech segments in an input speech signal wherein the input speech signal is a speech signal in training data;

program instructions to calculate an upper variance and a lower variance, the upper variance being a variance of upper spectra larger than a criteria among speech spectra corresponding to frames in the speech segments, the lower variance being a variance of lower spectra smaller than a criteria among the speech spectra corresponding to the frames in the speech segments, wherein the calculating further comprises:

program instructions to calculate for a plurality of dimensions of the speech spectra, a plurality of upper variances and a plurality of lower variances;

program instructions to generate an acoustic model for detecting special speech data;

program instructions to output new speech signal by converting a speech signal in training data to log mel spectra each corresponding to one frame and performing a combination of two methods for the log mel spectra;

program instructions to determine whether the input speech signal is a special input speech signal using a difference between the upper variance and the lower variance, wherein the determining further comprises:

program instructions to determine whether the input speech signal is the special input speech signal based on comparison results between an average of a plurality of differences and a predetermined threshold, each of the plurality of differences being a difference between one of the plurality of upper variances and corresponding one of the plurality of lower variances; and responsive to determining the input speech signal is special, program instructions to perform speech recognition of the special speech signal which has been determined to be special based on the generated acoustic model.

14. The computer program product of claim 13, wherein the calculating comprises calculating, for a plurality of dimensions of the speech spectra, a plurality of upper variances and a plurality of lower variances, and the determining comprises determining whether the input speech signal is the special input speech signal based on output results of a classifier in response to input of a plurality of differences, each of the plurality of differences being a difference between one of the plurality of upper variances and corresponding on of the plurality of lower variances.

15. The computer program product of claim 13, wherein the special speech data appears less noisy than other speech data, but possesses a characteristic of having many time-frequency regions each with a very weak speech power and the special speech signal has the characteristics of the special speech data, and wherein the method further comprises:

generating a special training speech signal imitating the special input speech signal; and preparing the special acoustic model.

16. The computer program product of claim 15, wherein the generating comprises generating the special training speech signal by performing noise addition and over-subtraction for a training speech signal.

17. The computer program product of claim 15, wherein the generating comprises generating the special training speech signal by performing a processing to set the upper variance and the lower variance for a training speech signal.

* * * * *